United States Patent [19]

Lew

[11] Patent Number: 4,635,961

[45] Date of Patent: Jan. 13, 1987

[54] AIR-SPRING SUSPENSION

[76] Inventor: Hyok S. Lew, 7890 Oak St., Arvada, Colo. 80005

[21] Appl. No.: 705,489

[22] Filed: Feb. 25, 1985

[51] Int. Cl.$^4$ ............................................. B60G 11/26
[52] U.S. Cl. ..................................... 280/711; 188/271; 267/64.15
[58] Field of Search ............... 280/104, 702, 711, 712, 280/683, 698; 267/3, 9 R, 64.15, 140.1; 188/271; 105/453

[56] References Cited

U.S. PATENT DOCUMENTS

| 2,690,845 | 10/1954 | Macomber | 267/9 R |
| 3,035,851 | 5/1962 | Stengelin | 280/711 |
| 3,208,770 | 9/1965 | Freitas et al. | 280/711 |

FOREIGN PATENT DOCUMENTS

| 142729 | 8/1951 | Australia | 280/711 |
| 2611629 | 9/1977 | Fed. Rep. of Germany | 280/711 |
| 2400447 | 4/1979 | France | 280/104 |
| 748062 | 7/1980 | U.S.S.R. | 267/9 R |

Primary Examiner—John J. Love
Assistant Examiner—Ross Weaver

[57] ABSTRACT

This invention relates to an air-spring suspension system installed intermediate the carriage frame supported on wheels and the cargo or passenger holding structure supported by the carriage frame in the construction of power driven vehicles. The most preferable embodiment of the air-spring suspension is the air-spring suspension beam comprising a pair of beams assembled in a parallel configuration wherein the flanges of the two beams provide an elongated confined space intermediate the two beams, that houses one or more elastic compressed air containers cushioning the relative movements between the two beams in the lateral direction relative to one another. The air-spring suspension beam may further include means for damping the oscillatory movements between the two beams, which means may include the friction between the flanges of the two beams or the shock absorbers including dashpots.

9 Claims, 5 Drawing Figures

AIR-SPRING SUSPENSION

BACKGROUND OF THE INVENTION

The design and manufacturing of the suspension systems supporting the cargo holding structure installed on top of the axles employed in the construction of heavy weight ground vehicles poses a difficult problem that has not found any easy solution. Without any exception, the conventional design of all heavy ground vehicles prescribes the suspension system installed between the wheel axles and the carriage frame, which design has two serious faults in that, firstly, new suspension systems such as an air-spring system cannot be employed because of the limited space available intermediate the wheel axles and the carriage frame and, secondly, it has never examined the usefullness of employing more than one suspension system installed in series. The logic is crystal clear that the shock load on the primary suspension systems installed between the axles and the carriage frame can be drastically reduced if the secondary suspension system providing air cushions such as elastic compressed air containers are installed between the carriage frame and the cargo bed in the construction of heavy trucks, rail road flat cars and box cars and between the carriage frames and car body in the construction of tanks and armored vehicles.

The primary object of the present invention is to provide an air-spring suspension comprising a plurality of elastic compressed air containers installed intermediate the carriage frame supported on the wheels or endless tracks and the cargo holding structure supported by the carriage frame.

Another object is to provide an air-spring suspension beam comprising a pair of elongated members separated by a plurality of elastic compressed air containers providing cushioning for relative movements therebetween in the lateral direction.

A further object is to provide the air-spring suspension beam equipped with means for damping the oscillatory movements between the two elongated members constituting the air-spring suspension beam.

Yet another object is to provide a secondary suspension system for the ground vehicles that is installed in a series arrangement with the primary suspension system comprising the mechanical springs and shocks.

Yet a further object is to provide an additional suspension system for the ground vehicles installed in a series arrangement with the conventional suspension system installed on the axles of the vehicles wherein the magnitude of the suspension force is easily adjustable.

These and other objects of the present invention will become clear as the description thereof proceeds.

BRIEF DESCRIPTION OF FIGURES

The present invention may be described with a greater clarity and specifity by referring to the following figures.

DESCRIPTION OF THE ILLUSTRATED EMBIDIMENT

Figure 1:
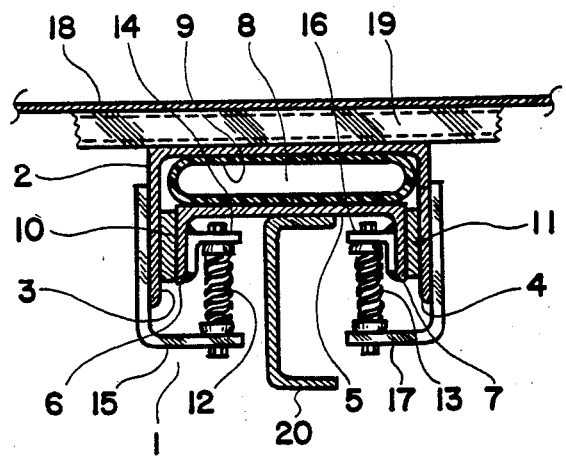
FIG. 1 illustrates a cross section of an embodiment of the air-spring suspension beam taken along a plane perpendicular to the lengthwise direction thereof.

In FIG. 1 there is illustrated a cross section of an embodiment of the air-spring suspension beam 1 constructed in accordance with the principles of the present invention, which cross section is taken along a plane substantially perpendicular to the lengthwise direction of the air-spring suspension beam 1. The air-spring suspension beam 1 comprises a first structural member 2 with cross section of a channel having a pair of deep flanges 3 and 4, and a second structural member 5 with cross section of a channel having a pair of shallow flanges 6 and 7. The two structural members 2 and 5 are disposed in a parallel configuration with their flanges pointing to a common direction wherein the U-shaped cross section of the first structural member 2 slidably receives the U-shaped cross section of the second structural member 5, which combination of two structural members 2 and 5 provides an elongated confined space 5 disposed therebetween in the lengthwise direction. One or more elastic compressed air container 9 is included in the confined space 5. A plurality of the brake pads 10 and 11 are disposed intermediate the flanges of the first structural member 2 and the flanges of the second structural member 5, which brake pads are affixed to either the flanges of the first structural member 2 or to the flanges of the second structural member 5. A plurality of the compression coil springs 12, 13 etc. are respectively disposed intermediate two series of a pair of brackets 14 and 15, and 16 and 17 wherein the brackets 14, 16, etc. are intermittently disposed following the length of the second structural member 5 and affixed to the flanges thereof, while the brackets 15, 17, etc. are intermittently disposed following the length of the first structural member 2 and affixed to the flanges thereof. The first structural member 2 is connected to and supports the bottom of a cargo holding structure comprising a plate 18 reinforced with a plurality of beams 19, while the second structural member 5 is connected to and supported by a beam 20 constituting the carriage frame of a vehicle supported on the axles of the vehicle.

The plurality of the elastic compressed air bags 9 containing the compressed air provide cushioning for the relative movements between the two structural members 2 and 5 toward to one another, while the plurality of the compression coil springs 12, 13, etc. plays the role of resilient stops which limit the relative movement between the two structural members 2 and 5 away from one another. The plurality of the brake pads 10 and 11 damp the oscillatory movements between the two structural members 2 and 5. It is quite clear that the plurality of the compression coil springs 12, 13, etc. may be replaced with a plurality of the shock absorbers comprising the compression coil springs and dashpots.

Figure 2:
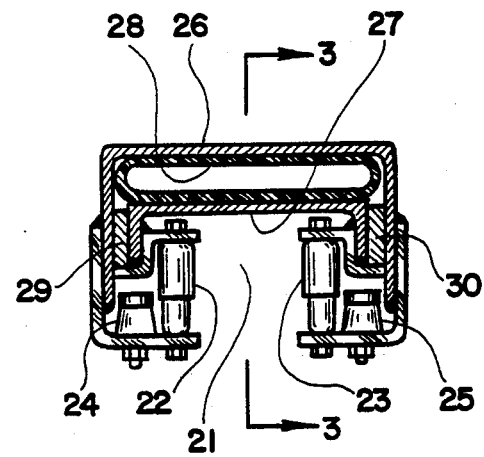
FIG. 2 illustrates a cross section of another embodiment of the air-spring suspension beam taken along a plane perpendicular to the lengthwise direction thereof.

In FIG. 2 there is illustrated a cross section of another embodiment of the air-spring suspension beam taken along a plane substantially perpendicular to the lengthwise direction thereof. The air-spring suspension beam 21 comprises essentially the same elements assembled essentially in the same manner as the air-spring suspension beam 1 shown in FIG. 1 with one exception being that a plurality of the shock absorbers 22, 23, etc. comprising dashpots and/or compressive coil springs replace the plurality of the compressive coil springs 12, 13, etc. employed in the embodiment illustrated in FIG. 1. A plurality of elastic stops 24, 25, etc. may be installed in parallel arrangement with the plurality of the shock absorbers 22, 23, etc. to limit the separation between the two structural members 26 and 27, which are resiliently separated by one or more elastic compressed air bags 28. The pads 29, 30, etc. disposed intermediate the flanges belonging to the two structural members 26 and 27 may be antifriction pads or friction pads depending on the design requirements.

Figure 3:
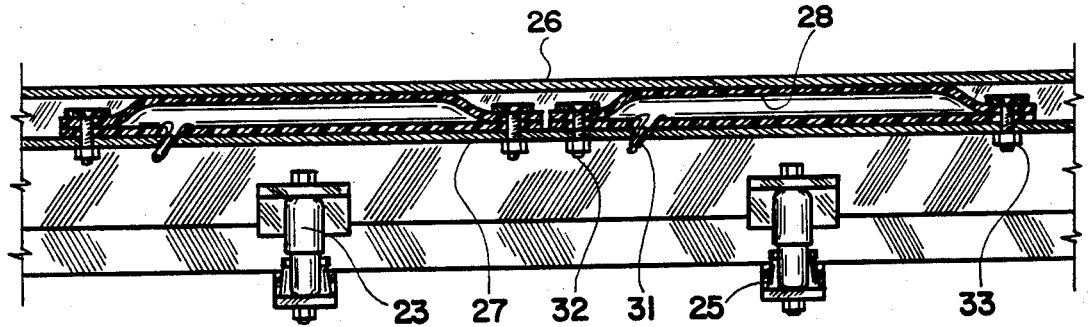
FIG. 3 illustrates another cross section of the air-spring suspension beam shown in FIG. 2.

In FIG. 3 there is illustrated another cross section of the air-spring suspension beam 21 shown in FIG. 2, which cross section is taken along a plane 3—3 parallel to the lengthwise direction of the air-spring suspension beam 21 as shown in FIG. 2. Each of the plurality of the elastic eompressed air bags 28 confined intermediate the two structural members 26 and 27 includes air valve 31 for inflation or deflation thereof and is tied down to one of the two structural members 26 and 27 by means of the plurality of the bolts and nuts 32 and 33 anchoring two extremities thereof onto the structural member 27. It should be understood that one or both longitudinal extremities of the air-spring suspension beam should include stop means for preventing the relative movements between the two structural members in the lengthwise direction thereof, while that stop means does not prevent the relative movements between the two structural members in the lateral direction. The simplest form of such stops is the flanges included at both extremities of the two structural members arranged in the same manner as the flanges included following their side edges as illustrated in FIGS. 1 and 2.

Figure 4:
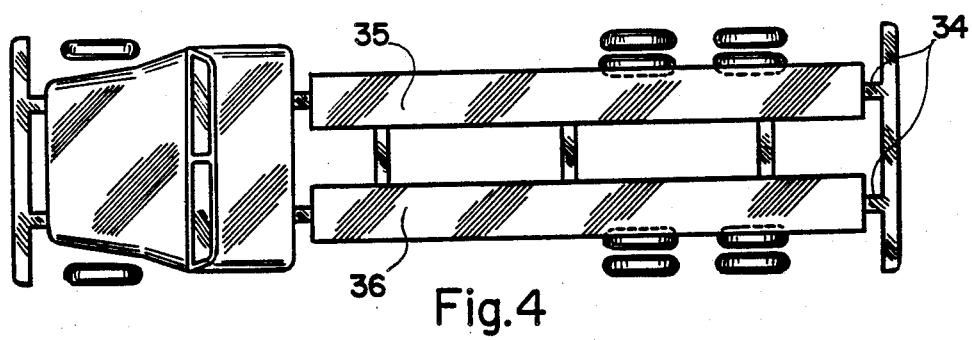
FIG. 4 illustrates a plan view of a truck frame equipped with a pair of air-spring suspension beams, on which a cargo holding structure can be installed.

In FIG. 4 there is illustrated a plan view of a truck with a bed frame 34 including a pair of the air-spring suspension beams 35 and 36 installed thereon, which air-spring suspension beams have the construction as shown in FIG. 1 or 2. A cargo holding flat bed or box is to be installed on top of the air-spring suspension beams 35 and 36 as described in conjunction with FIG. 1. With the air-spring suspension beams 35 and 36, the shock load imposed by the cargo being carried on the flat bed or in the box installed on top of the air-spring suspension beams is mostly absorbed by the air-spring suspension beams 35 and 36 and, consequently, the truck carriage frame, the mechanical spring suspension systems installed on the truck axles, the wheel bearings and tires of the truck are protected and spared from taking the beatings caused by the immense shock loads of the cargo weight.

Figure 5:
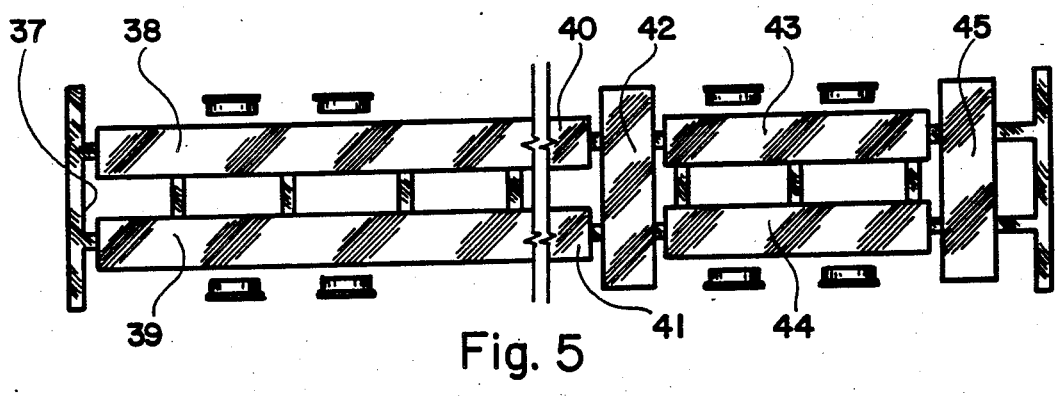
FIG. 5 illustrates a plan view of a rail road car carriage frame equipped with a plurality of air-spring suspension beams, on which a cargo holding structure can be installed.

In FIG. 5 there is illustrated a plan view of the carriage frame 37 of a rail road car equipped with a pair of the air-spring suspension beams 38 and 39 installed in a parallel configuration in the lengthwise direction or a plurality of the air-spring suspension beams 40, 41, 42, 43, 44, 45, etc. installed in a mixed configuration in the lengthwise and lateral directions, whereon a passenger coach or a box car or a flat bed car is to be installed.

It is quite clear that a plurality of the air-cushion suspension beam or air-cushion suspension pad can be installed intermediate the carriage frame and the car body in constructing military tanks and armored vehicles, which will resolve the serious design and maintenance problems posed by the present-day axle suspensions employed in heavy military vehicles. It is clear that pallets and platforms supporting delicate cargos or equipments can be constructed by using two or four air-spring suspension beams of the construction described in conjunction with the illustrative embodiments shown in FIGS. 1 and 2. It should be understood that the air-spring suspension system can be packaged in the shape of pad wherein one or more elastic compressed air bags are confined within a confined space provided by a combination of a flanged disc slidably receiving another disc.

While the principles of the present invention have now been made clear by the illustrative embodiments, it will be immediately obvious to those skilled in the art many modifications of the structures, arrangements, proportion, elements and materials which are particularly adapted to the specific working environments and operating conditions in the practice of the invention without departing from the principles of the present invention.

I claim:

1. An air-spring beam suspension system including at least one air-spring suspension beam or pad of elongated construction disposed intermediate a carriage frame supported on wheels and a passenger or cargo holding structure supported by said carriage frame, said air-spring suspension beam or pad comprising in combination:
   (a) a first rigid elongated member including a substantially flat base and flanges extending from the boundary of said substantially flat base in a direction substantially perpendicular to a plane including said substantially flat base;
   (b) a second rigid elongated member including a substantially flat base disposed adjacent to said first rigid elongated member in a parallel and superimposed relationship, said second rigid elongated member including flanges extending from the boundary of said substantially flat base in a direction substantially perpendicular to a plane including said substantially flat base, wherein said flanges of said second rigid elongated member guided by said flanges of said first rigid elongated member in a sliding relationship provides a confined space intermediate said first and second rigid elongated members;
   (c) a plurality of elastic containers containing compressed air or gas confined within said confined space intermediate said first and second rigid elongated members, said plurality of elastic containers including means for inflating or deflating said elastic containers;
   (d) means for limiting the distance of separation between said first and second rigid elongated members; and
   (e) means for damping the oscillatory movements of said first and second rigid elongated members relative to one another.

2. The combination as set forth in claim 1 wherein said means for damping comprises friction means for generating frictional resistance against the relative movements between said first and second rigid elongated members, said friction means disposed intermediate said flanges of said first rigid elongated member and said flanges of said second rigid elongated member.

3. The combination as set forth in claim 1 wherein said means for damping comprises at least one dashpot connected to said first rigid elongated member at one extremity and to said second rigid elongated member at the other extremity of said dashpot.

4. A plurality of air-spring suspension beams or pads of elongated construction disposed intermediate a vehicle bed frame supported on wheels and a cargo holding structure supported by said vehicle frame wherein said plurality of air-spring suspension beams or pads are installed in series in function with respect to the conventional suspension system installed intermediate wheel assemblies and said vehicle bed frame, each of said plurality of air-spring suspension beams comprising in combination:

(a) a first rigid elongated member including a substantially flat base and flanges extending from the boundary of said substantially flat base in a direction substantially perpendicular to a plane including said substantially flat base;

(b) a second rigid elongated member including a substantially flat base disposed adjacent to said first rigid elongated member in a parallel and superimposed relationship, said second rigid elongated member including flanges extending from the boundary of said substantially flat base in a direction substantially perpendicular to a plane including said substantially flat base, wherein said flanges of said second rigid elongated member guided by said flanges of said first rigid elongated member in a sliding relationship provides a confined space intermediate said first and second rigid elongated members;

(c) a plurality of elastic containers containing compressed air or gas confined within said confined space intermediate said first and second rigid elongated members, said plurality of elastic containers including means for inflating or deflating said elastic containers;

(d) means for limiting the distance of separation between said first and second rigid elongated members; and (e) means for damping the oscillatory movements of said first and second rigid elongated members relative to one another.

5. The combination as set forth in claim 4 wherein said means for damping comprises friction means for generating frictional resistance against the relative movements between said first and second rigid elongated members, said friction means disposed intermediate said flanges of said first rigid elongated member and said flanges of said second rigid elongated member.

6. The combination as set forth in claim 4 wherein said means for damping comprises at least one dashpot connected to said first rigid elongated member at one extremity and to said second rigid elongated member at the other extremity of said dashpot.

7. An Air-spring beam of elongated construction comprising in combination:

(a) a first rigid elongated member including a substantially flat base and flanges extending from the boundary of said substantially flat base in a direction substantially perpendicular to a plane including said substantially flat base;

(b) a second rigid elongated member including a substantially flat base disposed adjacent to said first rigid elongated member in a parallel and superimposed relationship, said second rigid elongated member including flanges extending from the boundary of said substantially flat base in a direction substantially perpendicular to a plane including said substantially flat base, wherein said flanges of said second rigid elongated member guided by said flanges of said first rigid elongated member in a sliding relationship provide a confined space intermediate said first and second rigid elongated members;

(c) a plurality of elastic containers containing compressed air or gas confined within said confined space intermediate said first and second rigid elongated members, said plurality of elastic containers including means for inflating or deflating said elastic containers;

(d) means for limiting the distance of separation between said first and second rigid elongated members; and (e) means for damping the oscillatory movements of said first and second rigid elongated members relative to one another.

(f) means for preventing relative movements between said first and second rigid elongated members in directions parallel to the length of said air-spring suspension beam.

8. The combination as set forth in claim 7 wherein said means for damping comprises friction means for generating frictional resistance against the relative movements between said first and second rigid elongated members, said friction means disposed intermediate said flanges of said first rigid elongated member and said flanges of said second rigid elongated member.

9. The combination as set forth in claim 7 wherein said means for damping comprises at least one dashpot connected to said first rigid elongated member at one extremity and to said second rigid elongated member at the other extremity of said dashpot.

* * * * *